(12) United States Patent
Langendorf et al.

(10) Patent No.: US 10,809,377 B2
(45) Date of Patent: Oct. 20, 2020

(54) CALIBRATING SYSTEM FOR CALIBRATING AT LEAST ONE DISTANCE-MEASURING DEVICE

(71) Applicant: Endress+Hauser SE+Co. KG, Maulburg (DE)

(72) Inventors: Björn Langendorf, Häg-Ehrsberg (DE); Harald Faber, Lörrach (DE); Andreas Roser, Steinen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 139 days.

(21) Appl. No.: 16/061,448

(22) PCT Filed: Nov. 16, 2016

(86) PCT No.: PCT/EP2016/077794
§ 371 (c)(1),
(2) Date: Jun. 12, 2018

(87) PCT Pub. No.: WO2017/102225
PCT Pub. Date: Jun. 22, 2017

(65) Prior Publication Data
US 2019/0078926 A1    Mar. 14, 2019

(30) Foreign Application Priority Data

Dec. 17, 2015   (DE) .......... 10 2015 122 057

(51) Int. Cl.
*G01F 23/292*    (2006.01)
*G01F 25/00*    (2006.01)
(Continued)

(52) U.S. Cl.
CPC ............ *G01S 17/08* (2013.01); *G01F 23/292* (2013.01); *G01F 25/0061* (2013.01);
(Continued)

(58) Field of Classification Search
CPC .... G01F 23/292; G01F 25/0061; G01S 17/06; G01S 17/08
See application file for complete search history.

(56) References Cited

U.S. PATENT DOCUMENTS

| 4,373,815 A | 2/1983 | Bruce |
| 4,832,452 A * | 5/1989 | Eisler .................. G01M 11/04 |
| | | 359/813 |
| 2001/0021898 A1 | 9/2001 | Greer et al. |

FOREIGN PATENT DOCUMENTS

| CN | 103472439 A | 12/2013 |
| DE | 102007043839 A1 | 4/2009 |

(Continued)

OTHER PUBLICATIONS

Burge, James H., et al. "Use of a commercial laser tracker for optical alignment" Optical System Alignment and Tolerancing, Poc. of SPIE vol. 6676, 66760E, (2007). (Year: 2007).*

(Continued)

*Primary Examiner* — Paul M. West
(74) *Attorney, Agent, or Firm* — Mark A. Logan; Endress+Hauser (USA) Holding Inc.

(57) ABSTRACT

The invention relates to a calibrating system for calibrating at least one distance-measuring device. In particular, the calibrating system is suitable for almost simultaneous calibration of a plurality of filling-level measuring devices. It is characterized in that a mirror arrangement is provided, by means of which a laser tracker can determine a least one distance to at least one reflector and at least one reference distance to the at least one distance-measuring device. The calibrating system according to the invention allows both the distance to the reflector and the reference distance to be determined by a single measuring device, without the at least one reflector having to be collapsible for this purpose or the calibration having to be interrupted. The calibrating system (Continued)

accordingly permits more precise calibration, the calibrating system further being operable with a high degree of automation.

9 Claims, 2 Drawing Sheets

(51) Int. Cl.
  *G01S 17/66* (2006.01)
  *G01S 17/88* (2006.01)
  *G01S 7/497* (2006.01)
  *G01S 17/08* (2006.01)
  *G01S 17/06* (2006.01)

(52) U.S. Cl.
  CPC .............. *G01S 7/497* (2013.01); *G01S 17/06* (2013.01); *G01S 17/66* (2013.01); *G01S 17/88* (2013.01)

(56) References Cited

FOREIGN PATENT DOCUMENTS

| | | |
|---|---|---|
| DE | 102012104926 A1 | 12/2013 |
| DE | 102014110807 A1 | 2/2016 |
| DE | 102014114139 A1 | 3/2016 |
| DE | 102014118862 A1 | 6/2016 |
| EP | 1067361 A1 | 1/2001 |
| EP | 1510779 A1 | 3/2005 |
| WO | 8806713 | 9/1988 |

OTHER PUBLICATIONS

Search Report for German Patent Application No. 10 2015 122 057.1, German Patent Office, dated Oct. 28, 2016, 4 pp.
Search Report for International Patent Application No. PCT/EP2016/077794, WIPO, dated Mar. 2, 2017, 13 pp.

* cited by examiner

CALIBRATING SYSTEM FOR CALIBRATING AT LEAST ONE DISTANCE-MEASURING DEVICE

CROSS-REFERENCE TO RELATED APPLICATIONS

The present application is related to and claims the priority benefit of German Patent Application No. 10 2015 122 057.1, filed on Dec. 17, 2015 and International Patent Application No. PCT/EP2016/077794, filed on Nov. 16, 2016 the entire contents of which are incorporated herein by reference.

TECHNICAL FIELD

The invention relates to a calibrating system for calibrating at least one distance-measuring device as well as a calibration method based on said calibrating system.

BACKGROUND

In automation, in particular in process automation, field devices serving to capture and/or modify process variables are frequently used. Sensors that are integrated in, for example, filling-level measuring devices, flow meters, pressure and temperature measuring devices, pH-redox potential meters, conductivity meters, etc., are used for capturing the respective process variables, such as fill level, flow rate, pressure, temperature, pH value, redox potential and/or conductivity. Actuators, such as, for example, valves or pumps, are used to influence process variables. The flow rate of a fluid in a pipeline section or a filling level in a container can thus be altered by means of actuators. The term field devices, in general, refers to all devices which are deployed in a process-oriented manner and which process or supply process-relevant information. In the context of the invention, field devices also refer to remote I/Os, radio adapters, and/or, in general, electronic components that are arranged at the field level. A variety of such field devices are manufactured and marketed by the Endress+Hauser company.

For filling-level measuring, contactless measuring methods have become established, because they are robust and require minimum maintenance. A further advantage lies in the fact that continuous measuring is possible. Here, in particular radar-based measuring methods operating according to the pulse transit time principle or the FMCW principle have become widespread. In these measuring methods, microwaves are periodically sent in the direction of the filling material with a prescribed repetition rate, e. g. in the order of magnitude from 1 to 10 MHz, with center frequencies in the gigahertz range. This serves to determine the distance between the filling-level measuring device and the surface of the filling material. On that basis, the filling level can be calculated.

For calibration of distance-measuring devices, in particular of aforementioned filling-level measuring devices, measuring sections are used having a length that corresponds at least to the measuring range of the distance-measuring device. For filling-level measuring, the maximum measuring range corresponds to a maximum fill level of up to 40 m.

A reflector is movably arranged on the respective measuring section. The distance-measuring device to be calibrated is mounted on one end of the measuring section. Then, a measurement signal is sent in the direction of the reflector for calibration, and the reflected measuring signal is received. The reflected measuring signal is aligned to the respective distance value ($X_i$), which was determined using a calibrated measurement standard. As a standard, several distance values ($X_1$-$X_n$) are approached for determining linearity.

In the simplest case, the calibrated measurement standard is a calibrated tape measure. For reasons of precision, however, usually optical methods like interferometry are used, so that the precision of the calibrated measurement standard is at least by one order of magnitude higher than the required precision of the distance measuring device to be calibrated.

In the event that an optical method is used as a measurement standard, determining the distance value ($X_i$) by means of the respective optical device cannot be performed directly, as it cannot be arranged at the same location as the distance-measuring device to be calibrated. Therefore, it is common practice to position the optical device, unlike the distance-measuring device, not at the start of the measuring section but at the opposite end. An assembly based hereupon is described in DE 10 2012 104 926 A1.

In such a configuration, the distance value results from the difference between the distance of the optical device from the reflector ($M_i$) and a reference distance (R), wherein the reference distance (R) is the distance between the optical device and the distance-measuring device:

$$X_i = R - M_i$$

Determining the reference distance (R) is possible in different ways. On the one hand, this can be done by means of a calibrated tape measure. However, in such case, the measurement accuracy of the measuring section would be limited by the accuracy of the tape measure.

In case of a measuring section shown in DE 10 2012 104 926 A1, it is appropriate for the optical device to also determine the reference distance (R) as well. However, this is only feasible if the reflector is collapsible in such a way, as to be outside the optical path between the optical device and the distance-measuring device in its collapsed state.

The disadvantage of such an arrangement lies in the fact that such a folding mechanism is hardly applicable in practice, as, at least in case of filling-level measuring devices, the measuring section is usually realized as a surge pipe. Therefore, in such case, the reflector is not accessible inside the surge pipe during calibration. Accordingly, it is also not possible to repeat the measurement of the reference distance (R) during calibration (if necessary, even multiple times). However, precisely this has a disadvantageous effect on the accuracy of a calibration going on for several hours, as the value of the reference distance (R) can change due to temperature fluctuations during the calibration.

Therefore, the invention is based on the task of providing a calibrating system and a corresponding calibration method for at least one distance-measuring device, with the help of which an improved calibration can be achieved.

SUMMARY

The invention solves this task by means of a calibrating system for calibrating at least one distance-measuring device. For this purpose, the system comprises:
  At least one measuring section, at which the at least one distance-measuring device is mounted,
  at least one reflector that is movably mountable on the at least one measuring section for reflecting a measuring signal ($D_i$) sent from the at least one distance-measuring device, and
  a laser tracker.

The calibrating system is characterized in that a mirror arrangement is provided, which mirror arrangement enables the laser tracker to determine at least one distance ($M_i$) to the at least one reflector and at least one reference distance ($R_i$) to the at least one distance-measuring device.

The calibrating system according to the invention enables determining both, the distance ($M_i$) to the reflector, as well as the reference distance ($R_i$), by means of a single measuring device, the laser tracker, without requiring the reflector to be collapsible. This serves to prevent a systematic measurement error from occurring due to the fact that the distance ($M_i$) and the reference distance ($R_i$) are determined using different measurement devices. Capturing the reference distance ($R_i$) multiple times during the calibration itself is also possible in this way.

As a prerequisite for determining the distance ($M_i$) and/or the reference distance ($R_i$) by means of the laser tracker, a retroreflector or a respective optic for reflecting the laser beam must be arranged at the reflector and the distance-measuring device respectively. Corresponding laser trackers that can detect the respective retroreflector, perform an absolute distance measurement, and track the retroreflector when it moves, are manufactured and sold by e. g. the company Leica Geosystems under the product name "Leica Absolute Tracker AT 40X".

A major advantage of the calibrating system according to the invention results from the possibility of calibrating several distance-measuring devices almost simultaneously. In such case, the calibrating system must be expanded such that it comprises a plurality of measuring sections having one reflector each for calibration of several distance-measuring devices. Hereby, the mirror arrangement has to be configured in such a way that it becomes possible for the laser tracker, at every measuring section, to determine a distance ($M_i$) to the respective reflector, and a reference distance ($R_i$) to the respective distance-measuring device.

Due to the utilization of the laser tracker in combination with the mirror arrangement, a further advantage with respect to a possible automation of the calibration results in connection with the invention: Automation can be achieved by a corresponding teaching-in of the laser tracker, by means of which the laser tracker can be taught to perform the coarse alignment needed for the detection of the respective retroreflector independently, if required.

A further automation level of calibration can be achieved in such a way that the at least one measuring section is configured to additionally comprise an actuator for displacing the at least one reflector. Hereby, the calibration could be performed by means of a superordinate unit that would be provided for controlling the distance-measuring device, the laser tracker and/or the actuator.

In the event of the distance-measuring device to be calibrated being a filling-level measuring device, an improved calibration can be achieved, if the at least one measuring section is a surge pipe. This usually corresponds to the later measuring environment, thus providing a very application-oriented calibration. It is common practice in such cases for the surge pipe to have a nominal diameter in the range of between DN 100 and DN 300.

Furthermore, the task of the invention is solved by a method for calibrating at least one distance-measuring device with the help of the calibrating system described above. Accordingly, the method comprises the following steps:

The laser tracker determines a reference distance ($R_i$),
the laser tracker determines a distance ($M_i$),
based on the reference distance ($R_i$) and the distance ($M_i$), a measuring distance ($X_i$) is determined,
a measuring signal ($D_i$) sent from the distance-measuring device is received by the distance-measuring device after having been reflected by the reflector, and
the distance-measuring device is calibrated based on the reflected measuring signal ($D_i$) and the measuring distance ($X_i$), whereby the calibration of the distance-measuring device is performed while the reflector is being displaced along the measuring section at different measuring distances ($X_i$-$X_n$).

In addition to that, the calibrating system according to the invention makes it possible for the reference distance ($R_i$ . . . , $R_n$) to be determined at different measuring distances ($X_i$-$X_n$), while the reflector is being displaced along the measuring section. Thus, the problem of the value of the reference distance (R) possibly changing during calibration due to temperature fluctuations is avoided.

With respect to these influences from the environment, a further improvement of the calibration is achieved, when the temperature, ambient pressure and/or humidity are taken into account, when the distance ($M_i$), the reference distance ($R_i$), and/or the reflected measuring signal ($D_i$) are determined. To this end, it is required to capture the respective influences from the environment and to perform a correction of the distance ($M_i$), the reference distance ($R_i$), and/or the reflected measuring signal ($D_i$) based on these influences. In some laser tracker types, this is already built in as a pre-integrated function.

In the event of the calibrating system according to the invention comprising a plurality of measuring sections for almost simultaneous calibration of several distance-measuring devices, the previously described method is performed at each of these measuring sections. Accordingly, at each individual measuring section the laser tracker determines a reference distance ($R_i$),
the laser tracker determines a distance ($M_i$),
based on the reference distance ($R_i$) and the distance ($M_i$), a measuring distance ($X_i$) is determined,
a measuring signal ($D_i$) sent from the distance-measuring device is received by the distance-measuring device after having been reflected by the reflector, and
the distance-measuring device is calibrated based on the reflected measuring signal ($D_i$) and the measuring distance ($X_i$).

BRIEF DESCRIPTION OF THE DRAWINGS

The invention is explained in more detail with reference to the following figures. These show.

DETAILED DESCRIPTION

Figure 1:
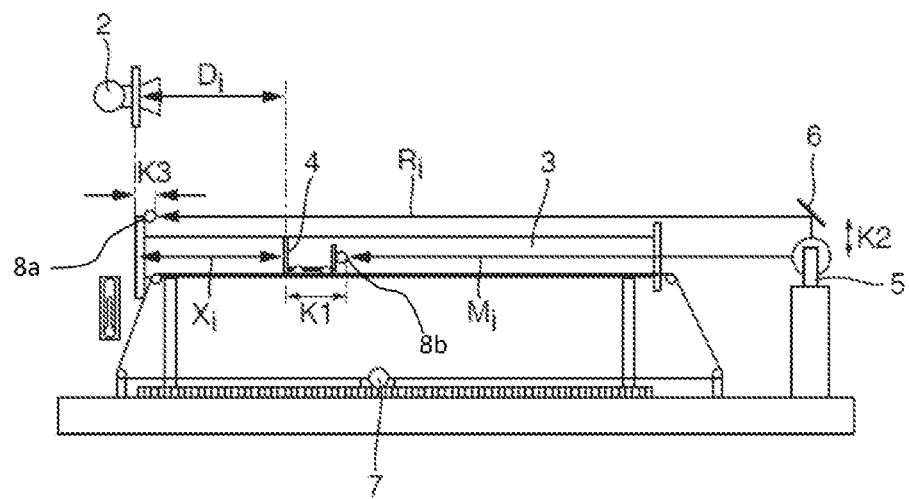
FIG. 1 shows a schematic representation of the calibrating system according to the invention.

FIG. 1 shows a calibrating system 1 for calibrating a filling-level measuring device 2 according to the invention. For this purpose, the calibrating system 1 comprises a measuring section 3 configured as a surge pipe. The filling-level measuring device 2 is mounted at a first end of the surge pipe 3, so that it can send measuring signals D, in the direction of a reflector 4 that is located in the surge pipe 3, and receive them after reflection. The reflector 4 is movably positioned within the surge pipe 3. This makes it possible for the distance X, between the filling-level measuring device 2 and the reflector 4 to be changed for calibration purposes. Positioning is hereby controlled via actuator 7 that is connected to the reflector 4 via a cable arrangement. For the purpose of a simpler overview, in FIG. 1, the filling-level measuring device 2 is shown to be offset relative to the surge pipe 3.

A laser tracker 5 is positioned at the opposite end of the surge pipe 3. In order for the laser tracker 5 to be able to measure the distance $M_i$ to the reflector 4 and/or the reference distance $R_i$ to the filling-level measuring device 2, a respective retroreflector 8a, 8b is arranged at the first end of the surge pipe 3 and at the reflector 4. In order to be able to determine both, the reference distance $R_i$ as well as the distance $M_i$ to the reflector 4, a mirror arrangement 6 is required according to the invention. In the embodiment variant of the calibrating system 1 shown in FIG. 1, the mirror arrangement 6 consists only of one mirror that can guide the laser beam of the laser tracker 5 to the retroreflector 8a arranged at the filling-level measuring device. Alternatively, according to the invention, the laser tracker 5 and the mirror arrangement 6 can, of course, be arranged such, that the retroreflector 8a that is located at the filling-level measuring device 2 can lie directly in the optical path of the laser tracker 5, and the retroreflector 8b of the reflector 4 is controllable via the mirror arrangement 6. However, it is advantageous in any case for the laser tracker 5 to be taught-in such that it can control both retroreflectors 8a, 8b and/or the mirror arrangement 6 independently.

By determining the distance $M_i$ to the reflector 4 as well as the reference distance $R_i$ by means of the laser tracker 5, it is possible, on the basis of the distances $R_i$, $M_i$, to calculate the distance $X_i$ between the filling-level measuring device 2 and the reflector 4 and, based on this, to perform the calibration:

$$X_i = R_i - M_i - K$$

This can be performed, for example, by a super-ordinate unit, in which the data of the filling-level measuring device 2, the laser tracker 5 and/or the actuator 7 are processed. In doing so, a correction factor K must be taken into account during the calculation. Said factor is formed from the sum total of the individual distance corrections $K_1$, $K_2$, $K_3$ resulting from the offset arrangement of the retroreflectors 8a, 8b and/or a prolongation of the beam path due to the mirror arrangement 6.

Figure 2:
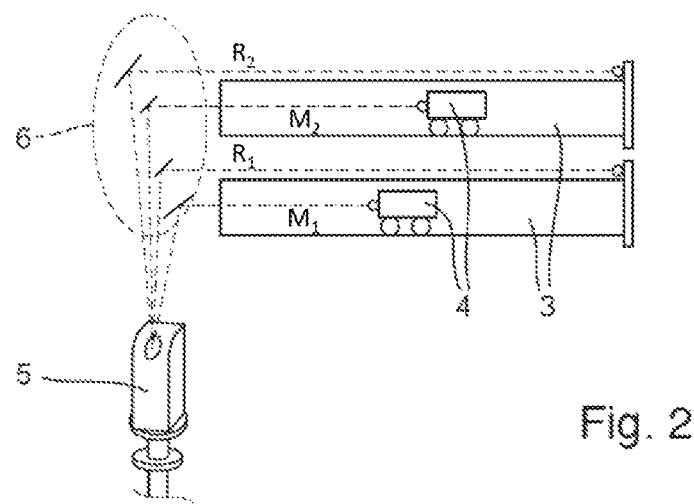
FIG. 2 shows a calibrating system having multiple measuring sections.

FIG. 2 shows that the calibrating system 1 according to the invention can not only comprise one measuring section 3, but also a plurality of measuring sections 3. In this case, the mirror arrangement 6 must be equipped with mirrors such as to enable the laser tracker 5, for every individual measuring section 3, to determine the distance $M_1$, $M_2$ to the respective reflector 4 and the respective reference distance $R_1$, $R_2$. This constitutes a major advantage of the calibrating system 1 according to the invention, namely the possibility of calibrating multiple distance-measuring devices 2 in an almost simultaneous manner, thus achieving a substantial time saving effect. For the sake of convenience, the filling-level measuring devices 2 to be calibrated are not shown in FIG. 2.

Figure 3:
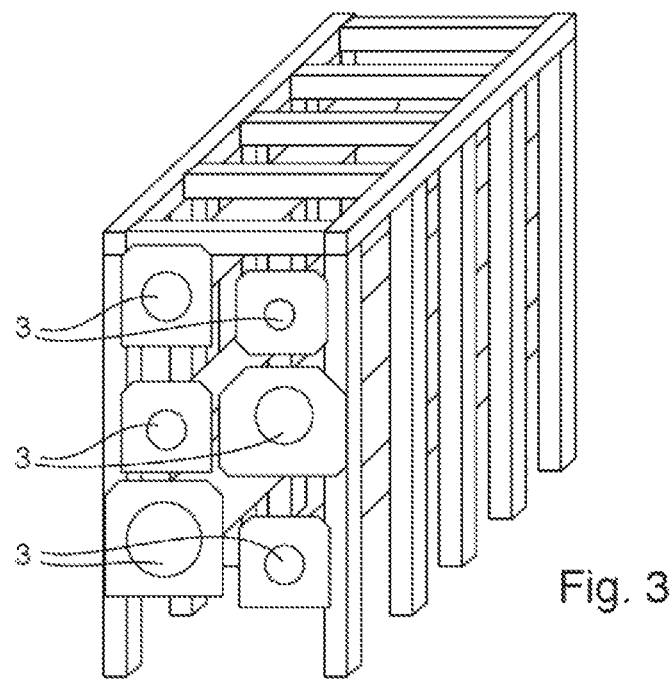
FIG. 3 shows an arrangement of multiple surge pipes as measuring sections.

As can be seen in FIG. 3, in case of multiple measuring sections 3, it is not compulsory for them to be arranged exclusively above each other or next to each other. In contrast to the display shown in FIG. 3, the measuring sections also do not have to be arranged parallel to each other. The displayed measuring sections 3 are surge pipes having different diameters. This enables an almost simultaneous calibration of multiple filling-level measuring devices 2, which require a calibration at different surge pipe diameters due to different measuring environments.

The invention claimed is:

1. A calibration system, comprising:
    a measuring section on which a distance-measuring device is mounted, wherein the measuring section is a surge pipe;
    a reflector movably mounted on the measuring section and disposed to reflect a measuring signal sent from the distance-measuring device;
    a laser tracker; and
    a mirror arrangement configured to enable the laser tracker to determine a distance to the reflector and a reference distance to the distance-measuring device.

2. The calibration system according to claim 1, further comprising:
    a plurality of measuring sections, each measuring section including one reflector and one distance-measuring device,
    wherein the mirror arrangement is configured to enable the laser tracker, at each measuring section, to determine a distance to the respective reflector and a reference distance to the respective distance-measuring device.

3. The calibration system according to claim 1, wherein the measuring section includes an actuator configured to displace the reflector.

4. The calibration system according to claim 3, further comprising:
    a superordinate unit configured to control the distance-measuring device, the laser tracker, and/or the actuator.

5. The calibration system according to claim 1, wherein the surge pipe has a nominal diameter in the range of between DN 100 and DN 300.

6. A method for calibrating a distance-measuring device, comprising:
    providing a calibration system, including
        a measuring section on which the distance-measuring device is mounted,
        a reflector moveably mounted on the measuring section and disposed to reflect a measuring signal sent from the distance-measuring device,
        a laser tracker, and
        a mirror arrangement configured to enable the laser tracker to determine a distance to the reflector and a reference distance to the distance-measuring device;
    determining the reference distance using the laser tracker;
    determining the distance to the reflector using the laser tracker;
    determining a measuring distance from the distance-measuring device to the reflector based on the reference distance and the distance from the laser tracker to the reflector;
    sending a measuring signal from the distance-measuring device to the reflector and receiving the measuring signal by the distance-measuring device after the measuring signal has been reflected by the reflector;
    calibrating the distance-measuring device using the reflected measuring signal and the measuring distance; and
    displacing the reflector along the measuring section at different measuring distances and repeating the determining of the distance from the laser tracker to the reflector, the determining of the measuring distance, the sending and receiving of the measuring signal, and the calibrating of the distance-measuring device.

7. The method according to claim 6, wherein the reference distance is determined at different measuring distances, while the reflector is being displaced along the measuring section.

8. The method according to claim 6, further comprising:
   determining a temperature, an ambient pressure and/or an air humidity; and
   taking into account the temperature, the ambient pressure, and/or the air humidity when the distance from the laser tracker to the reflector, the reference distance, and/or the reflected measuring signal are determined.

9. The method according to claim 6, wherein the calibration system includes a plurality of measuring sections, each measuring section including a reflector and a distance-measuring device, the method further comprising:
   at each measuring section:
      determining a reference distance using the laser tracker;
      determining a distance from the laser tracker to the reflector;
      determining a measuring distance based on the reference distance and the distance from the laser tracker to the reflector;
      sending a measuring signal from the distance-measuring device to the reflector and receiving the measuring signal by the distance-measuring device after the measuring signal has been reflected by the reflector; and
      calibrating the distance-measuring device based on the reflected measuring signal and the measuring distance.

* * * * *